2,833,783

TREATMENT OF POLYCHLORO COPPER PHTHALOCYANINE

Felix Frederick Ehrich, Westfield, and Hans Billroth Gottlieb, Glassboro, N. J., assignors to E. I. du Pont de Nemours & Company, Wilmington, Del., a corporation of Delaware No Drawing. Application April 12, 1954
Serial No. 422,673

4 Claims. (Cl. 260—314.5)

This invention relates to a process for the treatment of crude polychloro copper phthalocyanine whereby to obtain the color in a finely divided physical form having good pigmentary properties such as tinctorial strength, softness and freedom from grit. In this application, the term polychloro copper phthalocyanine shall be understood as referring to a color having a chlorine analysis of not less than 46.0%, which corresponds to 13.5 Cl atoms per molecule.

The nature of the pigmentary state and the general problem of how to achieve this state from a crude reaction product obtained in the synthesis of a given phthalocyanine color are discussed more fully in copending application of Stryker, Williamson and Gross, Serial No. 422,492, filed April 12, 1954. Briefly defined, the pigmentary state implies that the color is in a fine physical state of subdivision, which is adapted directly for incorporation into liquid organic vehicles for paints, varnishes or printing inks. The pigment in this state may be in the form of a soft powder, or it may be in the form of an aqueous paste which yields readily a soft powder upon drying, the term "soft" in this designation having reference to the ease of incorporation into said liquid vehicles, with development therein of the full tinctorial qualities of the pigment. Contrasted with the pigmentary state is the crude state, wherein the color may not only be contaminated with various chemical by-products, but is in a hard crystalline state which does not directly disperse in said vehicles to give a paint, for instance, of highest tinctorial strength or does so only after excessive joint grinding of the color and vehicle. The said copending application also offers a solution to this problem for the case of polychloro copper phthalocyanine crude which is synthesized by chlorinating copper phthalocyanine in a low-melting mixture of aluminum chloride and sodium chloride (the so-called "eutectic process").

We now find that by the special treatment hereinbelow set forth, the invention of Stryker et al. may be extended also to polychloro copper phthalocyanine which was synthesized in the absence of aluminum chloride or to material from the eutectic process from which the bulk of the aluminum chloride had been washed out and which was then dried. These materials are not directly responsive to the aqueous and solvent treatments described in said copending application.

More particularly, we have found to our great surprise that the presence of aluminum chloride, aluminum bromide or ferric chloride in intimate contact with the pigment during the aforementioned liquid treatments is an essential factor in producing the results sought, that is conversion of the crude pigment into the pigmentary state. This is a most astonishing phenomenon, inasmuch as we know of no precedent for the use of aluminum chloride or the like to influence the physical form of a substance or its behavior toward subsequent physical treatment with organic liquids and water.

Accordingly, this invention contemplates predisposing polychloro copper phthalocyanine crudes in general to subsequent physical treatment with organic liquids and water by bringing about intimate contact, under anhydrous conditions, between the crude and a metal halide of the formula $MX_3$, wherein M stands for aluminum or iron while X designates chlorine or bromine.

The treatment may consist simply of treating the dry crude with a solution or suspension of the chosen metal halide in an organic liquid. Obviously, it is advantageous to choose for this purpose the same organic liquid as is contemplated for use in the subsequent two-fold treatment of the pigment with organic liquid and water. Consequently, the organic liquid is preferably chosen of the type defined in said copending application, namely: It is a liquid which is immiscible with water and which will normally displace water from the surface of a solid phthalocyanine pigment particle. In other words, the organic liquid is one which is adapted for "flushing" a phthalocyanine pigment, for instance copper phthalocyanine, out of an aqueous mass thereof. In addition, it is desirable that the liquid chosen shall not decompose aluminum chloride and shall be volatile with steam, so as to be capable of removal by steam distillation if desired. As specific illustrations of suitable liquids may be mentioned toluene, xylene, p-chlorotoluene, o-dichlorobenzene, trichlorobenzene, nitrobenzene, o-nitrotoluene, mineral spirits, trichloroethylene, tetrachloroethylene, cetane, pine oil, benzonitrile, dimethyl aniline, quinoline and n-amyl acetate.

Obviously, our present invention is of primary interest in the case of such polychloro crudes as have not been formed in the presence of a particular metal halide of the formula above set forth.

As an example of such crudes may be mentioned polychloro copper phthalocyanine obtained by the fluid-bed process of Barnhart and Grimble, U. S. P. 2,586,598. Our improved process, however, may also be applied to polychloro copper phthalocyanine which had been synthesized in the presence of aluminum chloride (e. g. the eutectic product above referred to or the product of the modified $SCl_2$ process set forth in copending application of Felix F. Ehrich, Serial No. 422,674), but from which the aluminum chloride was subsequently removed by aqueous extraction followed by drying.

The quantity of metal halide to be applied to the pigment according to our invention is of a molecular order. In other words, it should be not less than 2 moles of $MX_3$ per mole of polychloro pigment.

Following treatment with the halide, the mixture of pigment and organic liquid may be drowned in water to dissolve out the metal halide, whereupon the mass on hand may be further treated in any convenient manner to obtain it in any desired commercial form.

Such further treatment may follow essentially the lines of copending application of Stryker, Williamson and Gross, Serial No. 422,442, of even date herewith. For instance, the mass may be filtered to eliminate excess water, and then handled in commerce as a paste containing both water and organic solvent. Or the filtered mass may be steam distilled, filtered off and washed to give a purely aqueous paste. Or again, the mass may be steam distilled, filtered off, washed and dried to give a dry product. Various modifications or combinations of these methods or other elaborated modes of isolation may also be applied.

While we do not wish to limit our invention to any particular theory, it appears to us that the mechanism of this novel phenomenon on which our invention is based is probably as follows:

Polychloro copper phthalocyanine exists in the crude state as small irregular shaped particles of wide particle size distribution. Treatment with metal halide causes the latter to be adsorbed onto the surface of the pigment particles or to form a loose chemical combination therewith. Upon subsequent treatment of the pigment-metal-halide combination with an organic liquid, the former increases slightly in size and forms well defined parallelopiped crystals of uniform particle size. The metal halide is then displaced from the particle surface by the organic liquid and dissolves in the water phase.

As in the said two copending applications of Stryker, Williamson and Gross, the final products obtained in the above indicated treatments possess not only the desired pigmentary state, but also distinct physical differences over pigmentary material obtained from the same polychloro crudes by other procedures, for instance by acid pasting. For instance, we find the products treated according to this invention to be at least equal in brilliance (sometimes referred to as intensity) to the acid-pasted material, and frequently of jetter masstone.

The qualities of the product may also be controlled to some extent by introducing special modifications in the general recovery procedure. For instance, maintenance of the mass at a pH greater than 7 during steam distillation, where such step is employed, has been observed to give products of highest tinctorial strength. Addition of minor quantities (say about 2% based on weight of pigment) of oxiding agents, for instance sodium chromate or sodium nitrite, exerts a beneficial effect upon the brilliance of the color. Addition of minor quantities (about 2%) of fatty compounds such as natural fats, long-chain fatty acids, soaps or esters, or long-chain fatty alcohols or their esters (acetates, propionates, etc.) contributes toward the production of soft powders.

Any other of the modifications in detail of procedure indicated in said copending application of Stryker et al., of even date herewith, may be practiced with our invention.

Without limiting our invention, the following examples are given to illustrate our preferred mode of operation. Parts mentioned are by weight.

EXAMPLE 1

*Treatment of eutectic product which had first been isolated in dry form by other procedures*

Step 1.—350 parts of a melt obtained by chlorinating 53 parts of copper phthalocyanine in an anhydrous aluminum chloride-sodium chloride melt according to U. S. P. 2,247,752 until 49 parts of chlorine have been absorbed were drowned in 1600 parts of cold water. The slurry was filtered and the cake was washed with water and dried.

Step 2.—25 parts of the dry polychloro copper phthalocyanine obtained in Step 1 were slurried with 25 parts of anhydrous aluminum chloride in 650 parts of o-dichlorobenzene for 18 hours at 28°–30° C. The slurry was poured with agitation into 500 parts of water and the o-dichlorobenzene was removed by steam distillation. 100 parts of sodium hydroxide were added as a concentrated aqueous solution and the aqueous color slurry was heated at 100° C. for 20 minutes. The slurry was then filtered and the cake was washed with water until free from alkali and water-soluble chlorides.

When a portion of the filter cake was dried, pulverized and ground into lithographic varnish, it was found to be yellower, brighter, of greater tinctorial strength and of darker masstone compared to polychloro copper phthalocyanine prepared by acid pasting.

When the o-dichlorobenzene of this example was replaced by 440 parts of benzene, similar results were obtained. The same was true when the o-dichlorobenzene was replaced by 600 parts of nitrobenzene and the aluminum chloride was replaced by 48 parts of anhydrous aluminum bromide.

EXAMPLE 2

25 parts of the dry polychloro copper phthalocyanine obtained in Step 1 of Example 1 and 12.5 parts of anhydrous aluminum chloride were slurried in 600 parts of nitrobenzene for 18 hours at 28°–30° C. The nitrobenzene was then removed by steam distillation. 52 parts of sodium hydroxide were added as a concentrated aqueous solution and the aqueous color slurry was heated at 100° C. for 20 minutes. The slurry was then filtered and the cake was washed with water until free from alkali and water-soluble chlorides.

When a portion of the filter cake was dried, pulverized and ground into lithographic varnish, it was found to be yellower, brighter, jetter of masstone and to have 15% greater tinctorial strength than polychloro copper phthalocyanine prepared by acid pasting.

EXAMPLE 3

*Treatment of fluidized-bed chlorination product*

The polychloro copper phthalocyanine employed in this example was prepared according to Example 1 of U. S. 2,586,598 (fluidized-bed chlorination process), then washed free of sodium chloride with water and dried. 25 parts of the dried pigment thus obtained were slurried with 29 parts of anhydrous ferric chloride in 650 parts of o-dichlorobenzene for 18 hours at 28°–30° C. The slurry was poured with agitation into 500 parts of water and the o-dichlorobenzene was removed by steam distillation. The aqueous color slurry was filtered and the filter cake then reslurried in 950 parts of water and 50 parts of hydrogen chloride for 2 hours at 70° C. The slurry was then filtered and the cake was washed with water until free from acid and water-soluble chlorides.

A portion of the filter cake was dried, pulverized and ground into lithographic varnish on an ink mill. It was found to be jetter in masstone, brighter in shade and considerably stronger than acid-pasted polychloro copper phthalocyanine powder.

EXAMPLE 4

*Treatment of polychloro product from sulfur dichloride process*

This example uses a crude polychloro copper phthalocyanine, chlorinated after the teachings of Fox and Johnson (U. S. 2,377,685) in which copper phthalocyanine is heated under pressure with sulfur dichloride and in the presence of 5% antimony chloride as the catalyst. 150 parts of such a crude polychloro copper phthalocyanine were introduced into 1500 parts of o-dichlorobenzene to which were then added 150 parts of anhydrous aluminum chloride. The mixture was stirred at room temperature for about 6 hours and the o-dichlorobenzene was removed by steam distillation in the presence of 2% sperm oil (based on weight of pigment). The slurry was filtered hot, washed free of chlorides, dried and pulverized to give a polychloro copper phthalocyanine having excellent pigmentary qualities.

It will be understood that in the above examples where aluminum chloride is mentioned it may be replaced by aluminum bromide or ferric chloride, and vice versa. Other permissible variations in detail will be readily apparent to those skilled in the art.

We claim:

1. A process of forming an aqueous paste of a pigmentary polychloro copper phthalocyanine from a dry, crude mass of said color which contains no substantial quantities of any salts of the form $MX_3$ as defined below, which comprises contacting said crude with a metal halide of the formula $MX_3$, wherein M is a metal of the group consisting of aluminum and iron while X is a halogen of the group consisting of chlorine and bromine, the quantity of said metal halide being not less than 2 moles of $MX_3$ per mole of pigment, said contacting being effected by stirring said crude and said metal halide together, under anhydrous conditions, in an organic liquid which is water-immiscible and which is capable of displacing water from the surface of phthalocyanine pigments, whereby to effect an intimate association of said crude with said metal halide, and then stirring the system thus obtained with water in sufficient quantity to dissolve out the metal halide.

2. A process as in claim 1, wherein the pigment crude is a polychloro copper phthalocyanine produced by chlorination of copper phthalocyanine in the absence of metal halides of the form $MX_3$ as there defined.

3. A process as in claim 1, wherein the pigment is finally separated from the bulk of the aqueous mass, to produce a commercial aqueous paste of the pigment.

4. A process as in claim 1, wherein the pigment is finally subjected to steam distillation, washing and drying to produce a dry pigment.

References Cited in the file of this patent

UNITED STATES PATENTS

| | | |
|---|---|---|
| 2,359,737 | Lacey et al. | Oct. 10, 1944 |
| 2,615,026 | Lytle | Oct. 21, 1952 |
| 2,615,027 | Bluemmel et al. | Oct. 21, 1952 |
| 2,618,642 | Keller et al. | Nov. 18, 1952 |

UNITED STATES PATENT OFFICE

CERTIFICATE OF CORRECTION

Patent No. 2,833,783

May 6, 1958

Felix Frederick Ehrich et al.

It is hereby certified that error appears in the printed specification of the above numbered patent requiring correction and that the said Letters Patent should read as corrected below.

Column 2, line 56, for "Serial No. 422,442" read -- Serial No. 422,492 -- column 3, line 25, for "oxiding" read -- oxidizing --.

Signed and sealed this 15th day of July 1958.

(SEAL)
Attest:
KARL H. AXLINE
Attesting Officer

ROBERT C. WATSON
Commissioner of Patents